United States Patent
Boyer

[15] 3,665,897
[45] May 30, 1972

[54] STEAM INJECTION DEVICE FOR INTERNAL COMBUSTION ENGINE

[72] Inventor: Oscar E. Boyer, Portland, Oreg.

[73] Assignee: Boyer & Abbott Enterprises, Inc., Portland, Oreg.

[22] Filed: July 10, 1970

[21] Appl. No.: 53,805

[52] U.S. Cl. ............................................123/25 B, 123/25 N
[51] Int. Cl. ...............................................F02d 19/00
[58] Field of Search .................. 123/25 R, 25 A, 25 B, 25 F, 123/25 G, 25 H, 25 J, 25 N, 25 P

[56] References Cited

UNITED STATES PATENTS

| | | | |
|---|---|---|---|
| 2,702,027 | 2/1955 | Drydyke | 123/25 N |
| 1,268,220 | 6/1918 | Douglass, Jr. | 123/25 N |
| 1,344,793 | 6/1920 | Dasey | 123/25 B |
| 1,466,425 | 8/1923 | Cowles | 123/25 B |
| 1,511,493 | 10/1924 | Barnum | 123/25 B |
| 1,897,344 | 2/1933 | Stimetz | 123/25 B |
| 1,966,345 | 7/1934 | Harrell | 123/25 N UX |
| 2,674,235 | 4/1954 | Drydyke | 123/25 B |
| 2,715,894 | 8/1955 | Shirrell | 123/25 B |

*Primary Examiner*—Al Lawrence Smith
*Attorney*—Lee R. Schermerhorn

[57] ABSTRACT

A steam generating tube is mounted in the exhaust manifold of the engine and supplied with water from a water tank. Wet steam generated in the tube passes through a steam separator and substantially dry steam is injected into the intake manifold of the engine to pass into the cylinders along with the fuel and air mixture from the carburetor. Water removed from the steam in the steam separator returns to the tank. The steam separator comprises a housing filled with stainless steel shavings, one end of said steam generating tube being connected with said housing. A tube to a steam control valve is connected to the top of said housing and a water return tube in the bottom of said housing is connected with said tank.

4 Claims, 2 Drawing Figures

Patented May 30, 1972
3,665,897
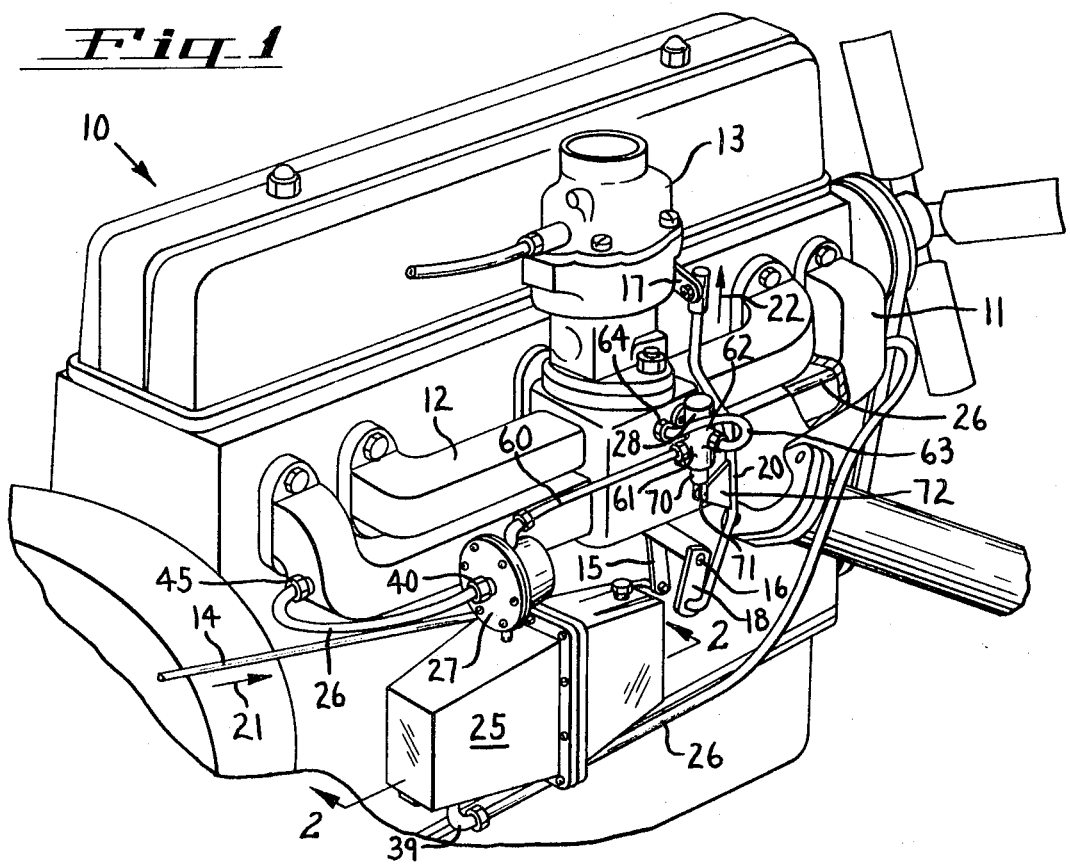
Fig. 1
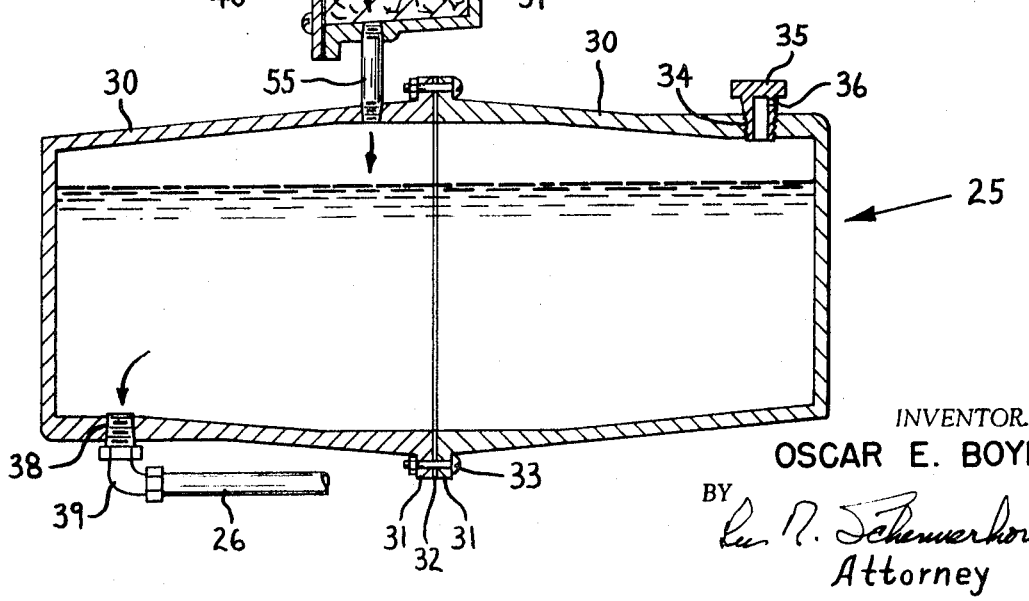
Fig. 2
INVENTOR.
OSCAR E. BOYER
Attorney

STEAM INJECTION DEVICE FOR INTERNAL COMBUSTION ENGINE

BACKGROUND OF THE INVENTION

This invention relates to a steam injection device for internal combustion engines and has particular reference to a device for injecting substantially dry steam into the intake manifold of an automobile engine for the purpose of producing a clean, smokeless exhaust.

It has been determined that a major source of air pollution in cities is caused by automobile exhausts. Since the automobile traffic density is so great in most cities, a marked improvement in air pollution could be effected by cleaning up the exhaust discharges from automobile engines. Apparatus heretofore proposed for this purpose has been impractical because of its high initial cost and expensive servicing requirements in order to keep it in good operating condition.

Objects of the present invention are, therefore, to provide a relatively simple and inexpensive device for cleaning up the exhaust from an internal combustion engine, to provide a device of the type described which does not require frequent or expensive servicing, to provide a device for generating substantially dry steam, and to provide a device of the type described in which the required steam is generated by a boiler tube inserted in the exhaust manifold of the engine.

SUMMARY OF THE INVENTION

The present device comprises simply a water tank, a steam generating tube, a valve and a steam separator to remove free water from the steam. The substantially dry steam obtained from the steam separator is injected into the intake manifold under control of a valve connected with the throttle linkage so that the amount of steam injected will increase in accordance with the amount of fuel-air mixture supplied to the engine.

The invention will be better understood and additional objects and advantages will become apparent from the following description of the preferred embodiment illustrated on the accompanying drawing. Various changes may be made in the details of construction and arrangement of parts and certain features may be used without others. All such modifications within the scope of the appended claims are included in the invention.

BRIEF DESCRIPTION OF THE DRAWING

FIG. 1 is a perspective view of an automobile engine embodying the invention; and FIG. 2 is an enlarged view of the line 2—2 in FIG. 1.

DESCRIPTION OF THE PREFERRED EMBODIMENT

For the purpose of illustration, the invention is applied to an internal combustion engine 10 having a conventional exhaust manifold 11 and intake manifold 12. Mounted on the intake manifold is a conventional carburetor 13 for supplying the necessary air-fuel mixture to the engine. The amount of air-fuel mixture supplied to the engine is controlled by the usual throttle rod 14 connected with a crank arm 15 on shaft 16. Movements of throttle rod 14 are transmitted to the throttle arm 17 of a butterfly valve in the carburetor through a throttle linkage comprising a second crank arm 18 on shaft 16 and a link 20 interconnecting the arms 17 and 18.

Movement of throttle rod 14 in the direction of arrow 21 in response to the depression of the accelerator pedal rotates crank arms 15 and 18 counterclockwise, moving link 20 upward in the direction of arrow 22 to open the throttle valve represented by the arm 17. The throttle valve is normally held in a substantially closed idling position by a spring, not shown. The parts thus far described are present in varying arrangements on all gasoline engines used in automobiles.

The present device comprises, essentially, a water tank 25, a steam generator tube 26, a steam separator 27 and a steam control valve 28.

Water tank 25 is preferably made in two identical halves 30 secured together on opposite sides of a gasket 32 by means of bolts 33. The two halves 30 are made of suitable size to hold enough water for a small engine so that the water supply will not have to be replenished except when the gasoline tank is filled. This form of construction permits the tank to be readily lengthened for use on larger engines by merely interposing a flanged tubular section between the two sections 30. One of the sections 30 is provided with a threaded filler hole 34 in its top wall equipped with a hollow threaded plug 35 having a vent opening 36.

The bottom wall of one of the tank sections 30 is provided with a threaded opening 38 to receive a fitting 39 connected to the lower end of steam generating tube 26. Tube 26 extends through the length of exhaust manifold 11 and its upper end is connected to a fitting 40 in the steam separator 27. A pair of bushings 45 seal the tube 26 in threaded openings in opposite ends of the exhaust manifold.

Steam separator 27 comprises a cup-shaped housing 50 filled with stainless steel shavings 51. These shavings are confined in housing 50 by a cover plate 52 which is secured by screws 53. The center of cover plate 52 is equipped with the previously mentioned connector fitting 40. Tube 26 discharges wet steam into the shavings 51. Shavings 51 separate any free water from the steam, causing the water to drain back into tank 25 through a tube 55 which supports the housing 50 on the top side of the tank.

A fitting 56 on the top side of housing 50 connects with a tube 60 leading to an inlet connection at 61 in valve 28. The valve has an outlet connection at 62 for discharging steam through a tube 63 and injection fitting 64 in inlet manifold 12.

Valve 28 may be a balanced spool-type valve having a plunger 70 to open and close the valve. Plunger 70 is pivotally connected at 71 with a bracket 72 on link 20. Valve 28 may be mounted on a convenient part of the manifold structure adjacent the throttle linkage, as shown. The valve may also be a rotary type arranged to throttle the steam flow in proportion to the flow of the air-fuel mixture from the carburetor.

Thus, valve plunger 70 follows the movements of throttle valve arm 17 to increase the steam flow through injection fitting 64 as the throttle is opened. When the throttle is closed to idling position, the steam flow is correspondingly reduced. Vent opening 36 in filler plug 35 allows for the escape of excess steam so that objectionable steam pressure will not build up in the system.

The level at which water tank 25 is mounted is not critical. If the tank is below the exhaust manifold 11, intake suction pressure in tubes 63 and 60 is communicated through fitting 40 to the upper end of tube 26, causing water to be drawn through the tube from the tank when the engine is started. The suction effect is greater at fitting 40 than at tube 55 because of the shorter path of flow through the impedance of shavings 51 and because of the admission of atmospheric pressure into the tank through vent 36 when the tank is cold. The steam separator prevents water being drawn into the intake manifold before the exhaust manifold has become hot enough to generate steam in tube 26. When tube 26 is generating steam, the separator 27 serves as a steam chest to supply steam to tube 60, excess steam passing through tube 55 and condensing in tank 25.

The process by which the injection of steam into the combustion cycle of an internal combustion engine eliminates exhaust smoke is not understood but the present device is found to be effective for this purpose. An engine with a smokey exhaust after being equipped with the present device does not visibly soil a handkerchief held over the outlet to the exhaust pipe. At the same time, the quantity of steam injected is not sufficient to noticeably impair the operation of the engine or require any readjustment of the carburetor.

Having now described my invention and in what manner the same may be used, what I claim as new and desire to protect by Letters Patent is:

1. A steam injection device for an internal combustion engine comprising a steam generating tube mounted in the exhaust manifold of the engine, a water tank supplying water to said tube, a steam injector fitting in the intake manifold of the engine, means connecting said steam generating tube with said injector fitting including a steam control valve, means connecting said valve with the engine throttle valve linkage arranged to open said steam valve as said throttle valve is opened, a steam separator arranged to separate any free water from the steam received from said steam generating tube and return said water to said tank, said steam separator comprising a housing filled with stainless steel shavings, one end of said steam generating tube being connected with said housing, a tube to said steam control valve connected to the top of said housing, and a water return tube in the bottom of said housing connected with said tank.

2. A device as defined in claim 1 including a pair of bushings in opposite ends of said exhaust manifold supporting said steam generating tube in the manifold, the opposite end of said steam generating tube being connected to the bottom of said tank.

3. A device as defined in claim 1, said tank comprising a pair of flanged opposite end sections secured together by bolts in said flanges.

4. A steam injection device for an internal combustion engine comprising a pair of bushings in the exhaust manifold of the engine, a steam generating tube in said manifold mounted in said bushings, a water tank, a lower end of said tube being connected to the bottom of said tank, a steam separator connected to the upper end of said tube, a water return tube connected between the bottom of said separator and said tank, a steam control valve operable by the throttle linkage of the engine, a steam tube connected between the top of said separator and the inlet of said valve, a steam injector fitting in the intake manifold of the engine, a steam tube connected between said injector fitting and the outlet of said valve, and a vented filler plug in said tank.

* * * * *